United States Patent
Gordin et al.

(10) Patent No.: US 11,560,274 B2
(45) Date of Patent: Jan. 24, 2023

(54) INGREDIENTS FEEDER FOR AN AUTOMATED COOKING APPARATUS

(71) Applicant: Kitchen Robotics Ltd, Modiin (IL)

(72) Inventors: Yair Gordin, Modiin (IL); Ofer Zinger, Ramat Hasharon (IL)

(73) Assignee: Kitchen Robotics Ltd., Modiin (IL)

( * ) Notice: Subject to any disclaimer, the term of this patent is extended or adjusted under 35 U.S.C. 154(b) by 330 days.

(21) Appl. No.: 16/920,847

(22) Filed: Jul. 6, 2020

(65) Prior Publication Data
US 2022/0002090 A1    Jan. 6, 2022

(51) Int. Cl.
| | | |
|---|---|---|
| B65G 33/14 | (2006.01) | |
| B65G 43/08 | (2006.01) | |
| A47J 36/00 | (2006.01) | |
| A47J 37/12 | (2006.01) | |

(52) U.S. Cl.
CPC .............. *B65G 33/14* (2013.01); *A47J 36/00* (2013.01); *A47J 37/1228* (2013.01); *B65G 2201/0202* (2013.01)

(58) Field of Classification Search
None
See application file for complete search history.

(56) References Cited

U.S. PATENT DOCUMENTS

| | | | | |
|---|---|---|---|---|
| 4,378,897 A | * | 4/1983 | Kattelmann | B65D 90/48 222/64 |
| RE32,101 E | * | 4/1986 | Ricciardi | G05D 7/0605 222/77 |
| 5,004,400 A | * | 4/1991 | Handke | B65G 43/08 414/296 |
| 6,062,438 A | * | 5/2000 | Ellis | A47F 1/035 222/413 |
| 6,367,417 B1 | * | 4/2002 | Gal | A01K 5/0283 119/51.5 |
| 6,581,511 B2 | * | 6/2003 | Cusenza | A47J 47/01 99/290 |
| 10,106,333 B2 | * | 10/2018 | Beaujot | B65G 47/19 |
| 2015/0238046 A1 | | 8/2015 | Xu et al. | |

* cited by examiner

*Primary Examiner* — Kavel Singh
(74) *Attorney, Agent, or Firm* — Haim M. Factor; 1st-Tech-Ideas.com

(57) ABSTRACT

The ingredient feeder for automated cooking apparatus, covered in the present invention, is a horizontally oriented dispensing apparatus, having a variety of shapes and dimensions, constructed from different materials, thus optimized for a wide range of ingredients. Individually controlled, the feeders accurately and precisely dispense ingredients, while their positioning and orientation utilize space. Easy ingredient changes and refill by quick ingredient container replacement, enables a non-stop operation. A simple construction is aiming for operability and quick setup.

17 Claims, 11 Drawing Sheets

INGREDIENTS FEEDER FOR AN AUTOMATED COOKING APPARATUS

FIELD OF THE INVENTION

The present invention is about an ingredient feeder that can be aligned easily with an automated cooking apparatus. Moreover, said feeder utilizes minimal space besides, adapting in a way to a plurality of ingredients.

BACKGROUND OF THE INVENTION

With increased modernization steadily creeping in personal lifestyle, kitchen gadgets are becoming increasingly popular and efficient, all over the world. In that line, automatic cooking machines are increasingly becoming popular as these saves time as well as energy, considered core aspects of efficiency in a busy world.

Despite the progress of such automatic machines smoothing out cooking process considerably, still a considerable degree of limitation of these is quite palpable. While automatic cooking mechanism is primarily focused on undertaking various cooking modes, e.g., stir frying, stewing, deep frying, boiling, steaming, pan frying, roasting braise, little progress in automation had occurred in feeding the inputs. An existing prior art in this respect are as follows:

In US20150238046A1 titled, "Automatic ingredient feeding apparatus applicable in a fully automated cooking machine" An automatic ingredient feeding apparatus comprises a machine frame, a feeder mechanism, a flipping mechanism and a plurality of compartment door control mechanisms. The feeder mechanism comprises a shell, the shell is provided therein with a receiving space for receiving a multi-compartment container and is provided therein with a multi-compartment ingredient-dropping chamber facing the receiving space. The flipping mechanism is used for mounting the feeder mechanism on the machine frame and for controlling the feeder mechanism to implement a 180-degree flip. Each of the plurality of compartment door control mechanisms controls an opening/closing of a compartment door of the individual compartment of the multi-compartment ingredient-dropping chamber. The flipping mechanism and the plurality of compartment door control mechanisms are all connected to a master control device.

However, the ingredient feeder talked about has the disadvantage of insufficient ingredient space and lack of adaptability to various cooking ingredients required for a plurality of cooking, thus limiting the capability of the automatic cooking apparatus substantially. Such insufficiency of space for the ingredients as well as adapting the feeder to a plurality of raw cooking inputs of various shapes and sizes are tried to be taken care of, in the present invention.

SUMMARY OF THE INVENTION

An aspect of the present invention is to provide a feeder for automated cooking apparatus, which utilizes space in an optimized manner by placing the feeders horizontally and also uses plurality of different ingredients.

Another aspect of the present invention is to allow re-use of the feeder for different ingredients, having varied shapes and sizes.

Still another aspect of the invention is the provision of easily changing the ingredients of the feeder by the end-user of the apparatus.

A still further aspect of the invention is to provide a horizontal feeder, having a container of a substantially horizontal orientation.

In another aspect of the invention, the ingredient can be refilled offline in the ingredient container, away from the apparatus enabling a quick replacement and thus, ensuring a non-stop operation of the feeder.

Further, in an aspect of the invention, the feeder might contain a sensor or a series of sensors to indicate whether the amounts of the ingredient levels are running low. In that case, the container can be replaced, without interrupting or stopping the feeder operation.

Still in another aspect of the invention, the ingredient container geometry and materials might be optimized and altered as per the nature of the ingredients.

In another aspect of the present invention the horizontal feeders are placed side-by-side and in levels, for providing an efficient space utilization, and allowing a larger number of different ingredients to be stored in the same volume, compared to vertical feeders.

Another aspect of the invention is providing an apparatus with a simple mechanism not requiring complex setup and operable and re-usable by end-users.

In still another aspect of the present invention, horizontal feeders may be placed in levels, one above the other. Such topology may be more efficient in space utilization and allow a larger number of feeders per volume, therefore increasing the number of different ingredients that can be used by the automated cooking apparatus.

In a still further aspect of the present invention, the ingredients feeders of the cooking apparatus are controlled by a controller which may be operatively coupled to any one of the motors coupled with the feeders and configured to invoke the respective motor into action. The apparatus is further provided with a processor which instructs the controller to invoke a desired motor, based on a determination of a desired ingredient for provisioning.

REFERENCE NUMERALS

| | | | |
|---|---|---|---|
| 310 | Feeder Portion | 312 | Opening of Feeder Portion |
| 314 | Protrusion | 320 | Lower base |
| 322 | Dispensing Opening | 330 | Provisioning tunnel |
| 332 | Opening of provisioning tunnel | | |
| 335 | Motor of Augur Conveyer/ second Motor | | |
| 337 | Augur | 340 | First Motor |

DETAILED DESCRIPTION OF THE PREFERRED EMBODIMENTS

One technical problem dealt with by the disclosed subject matter is to provide a feeder for automated cooking apparatus that uses space in an efficient manner, allowing the automated cooking apparatus to use a plurality of different ingredients.

Another technical problem is to allow re-use of the feeder for different ingredients, having different shape and sizes. It may be desired to allow for an easy manner to change the ingredient contents of the feeder, such as by the end user of the apparatus.

One technical solution is to provide a horizontal feeder, having a container of a substantially horizontal orientation. In some cases, horizontal feeders may be placed side-by-side and in levels, so as to provide for efficient space utilization, and allowing a larger number of different ingredients to be stored in a same volume, compared to vertical feeders.

Another technical solution may be to include a provisioning tunnel of a constant size. An auger conveyor may be utilized to push the ingredients towards a desired location through the provisioning tunnel. Different augers may be provided, and the user may replace one auger by another, depending on the ingredients to be stored in the feeder. In some cases, the augers may be provided in a cartridge that may fit into the provisioning tunnel and potentially block a portion thereof, so as to decrease a diameter of the effective tunnel through which the ingredients are being provisioned.

One technical effect of utilizing the disclosed subject matter is to provide for a space-efficient storage for ingredients.

Another technical effect is to provide for a simple mechanism that can be re-used by end-users, and that does not require complex setup. Adaptation from one ingredient to another may be performed by a novice end-user with ease.

The disclosed subject matter may provide for one or more technical improvements over any pre-existing technique and any technique that has previously become routine or conventional in the art. Additional technical problem, solution and effects may be apparent to a person of ordinary skill in the art in view of the present disclosure.

In order to prepare food, an automated cooking apparatus requires an ingredients feeder. Each different ingredient may be stored in a different feeder. The number of feeders that can be used by the automated cooking apparatus may be important, as the larger the number of types of ingredients, the more recipes that can be prepared by the automated cooking apparatus.

Figure 1:
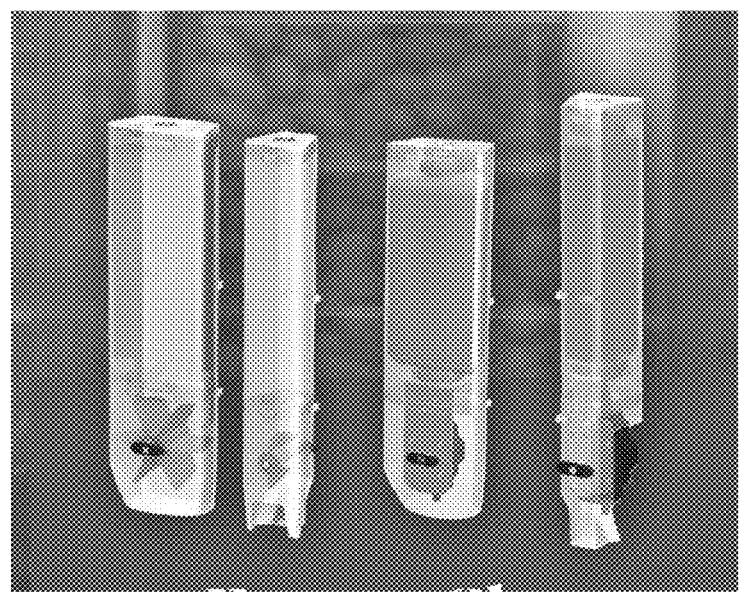
FIG. 1 is vertical ingredients feeder of Prior art.

Vertical feeders are one possible embodiment. However, such an embodiment is generally inefficient in storage space. Vertical feeders rely on gravity to cause the ingredients to slide or fall down before being dispensed. An example of vertical feeders is shown in FIG. 1.

Figure 2:
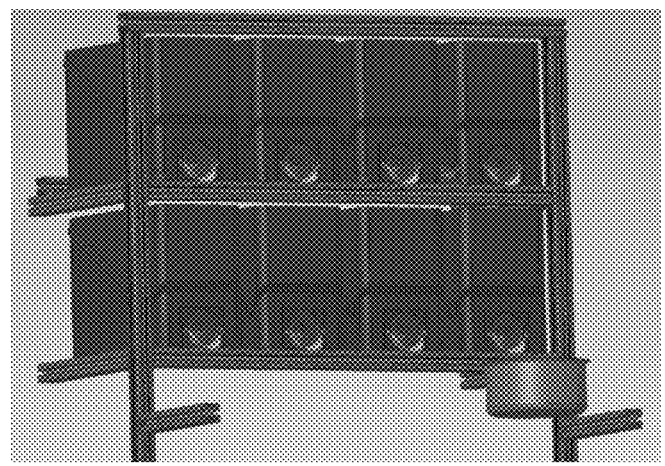
FIG. 2 is a view of stacked horizontal feeders of an automated cooking apparatus of the present invention.

In some exemplary embodiments, horizontal feeders may be utilized. A horizontal feeder may have a storage section that spreads horizontally. As is exemplified by FIG. 2, horizontal feeders may be placed in levels, one above the other. Such topology may be more efficient in space utilization and allow a larger number of feeders per volume, therefore increasing the number of different ingredients that can be used by the automated cooking apparatus.

Figure 3A:
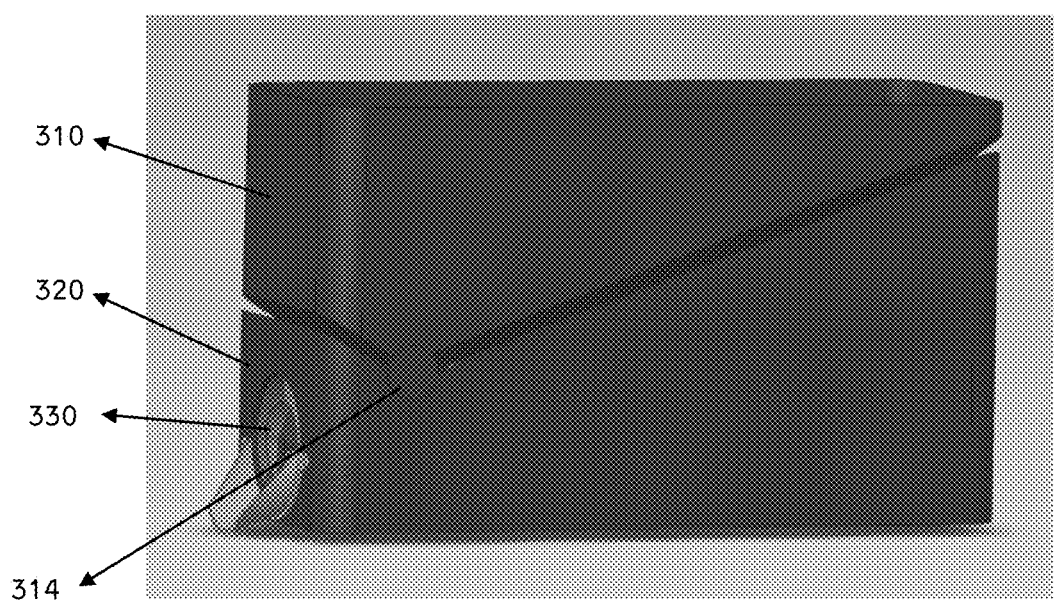
FIG. 3A is perspective view of the feeder of the present invention.
Figure 3B:
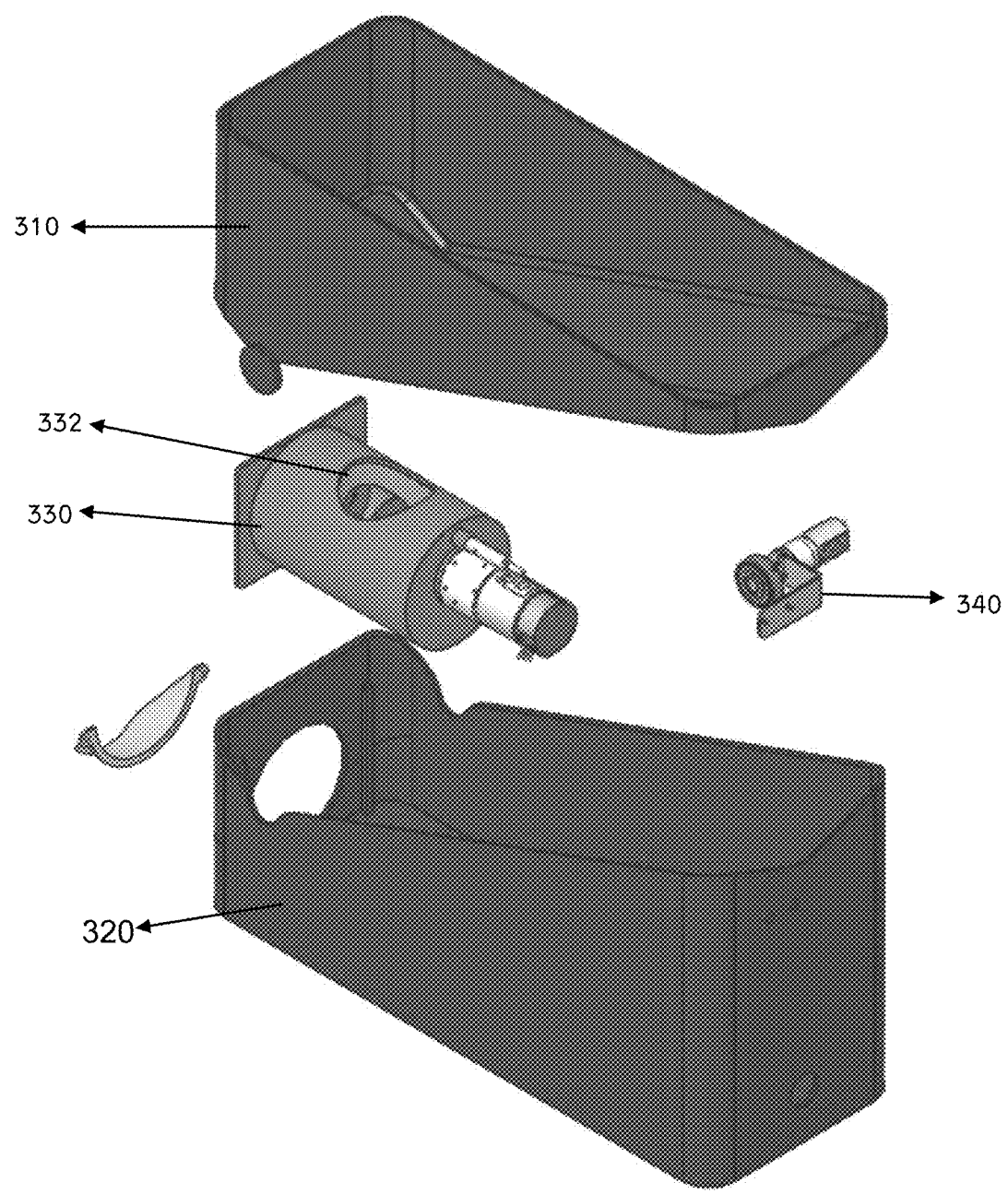
FIG. 3B is an exploded view of the feeder of the present invention depicting top and bottom portion of the feeder including the various internal parts of the feeder.
Figure 4A:
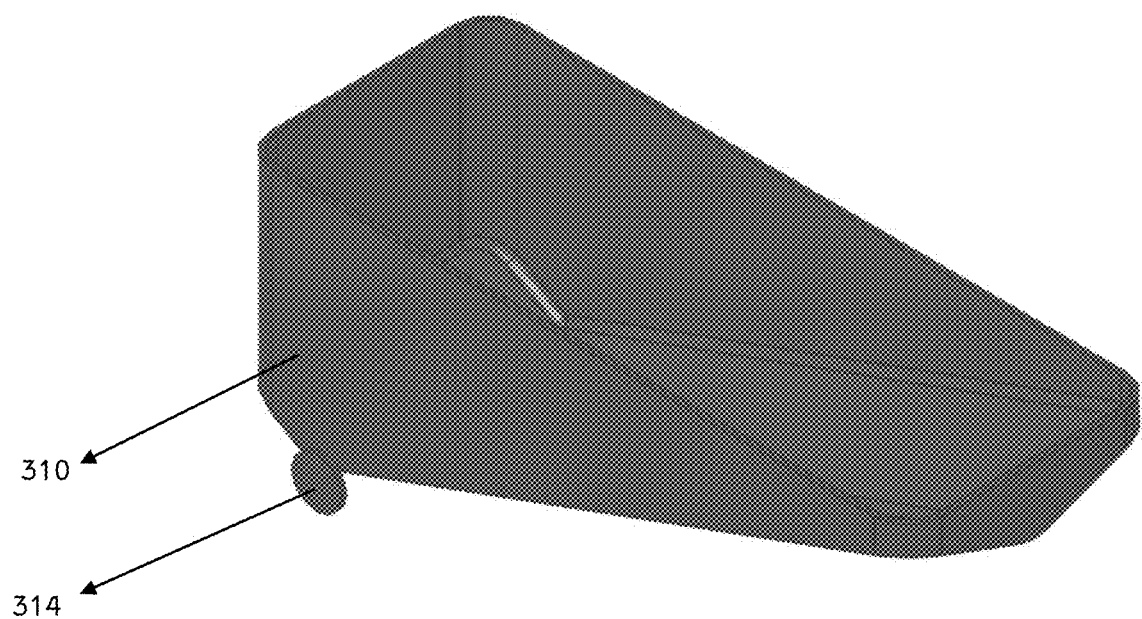
FIG. 4A is a view depicting the upper feeder portion, with the top cover removed thus exposing the interior of the feeder.
Figure 4B:
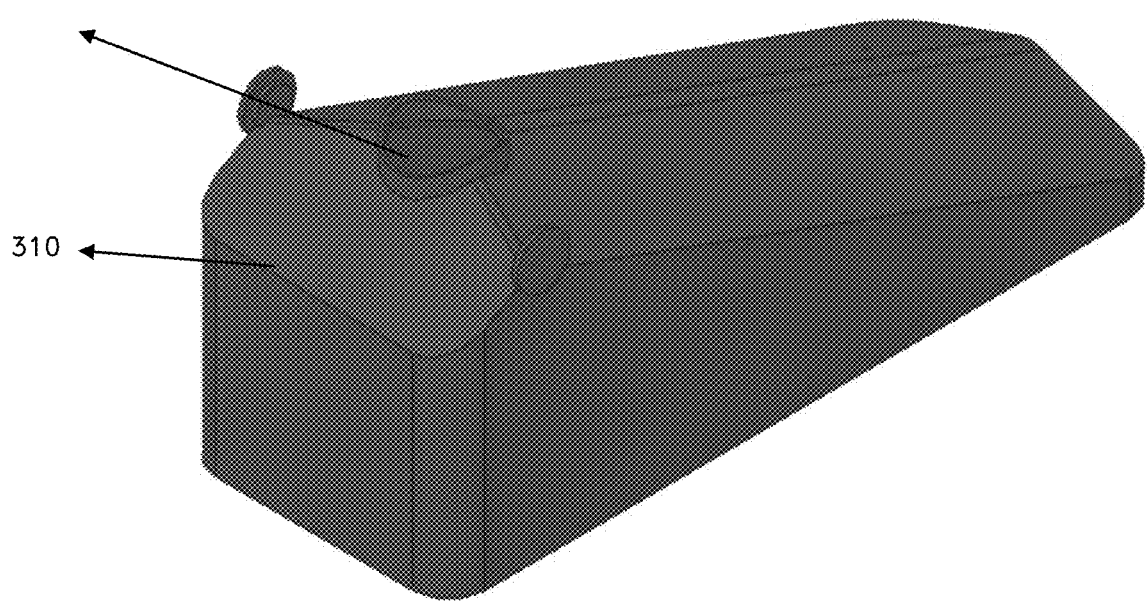
FIG. 4B is a view of an upturned upper feeder portion of the present invention, exposing the exact shape of the base of the upper feeder.
Figure 5:
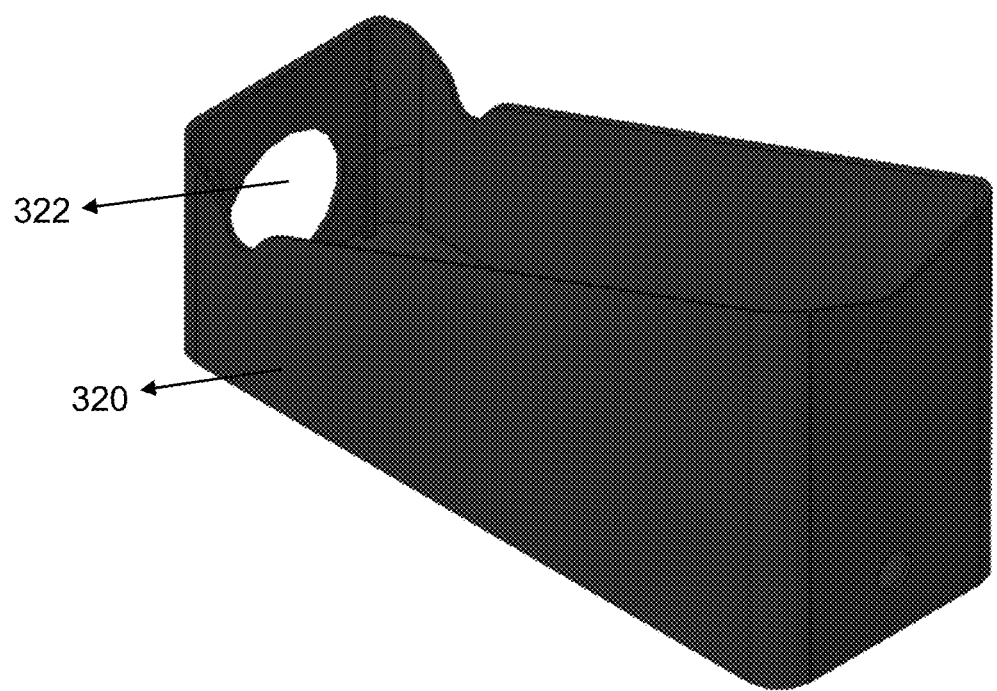
FIG. 5 depicts the various views of the lower portion of the feeder of the present invention.
Figure 5:
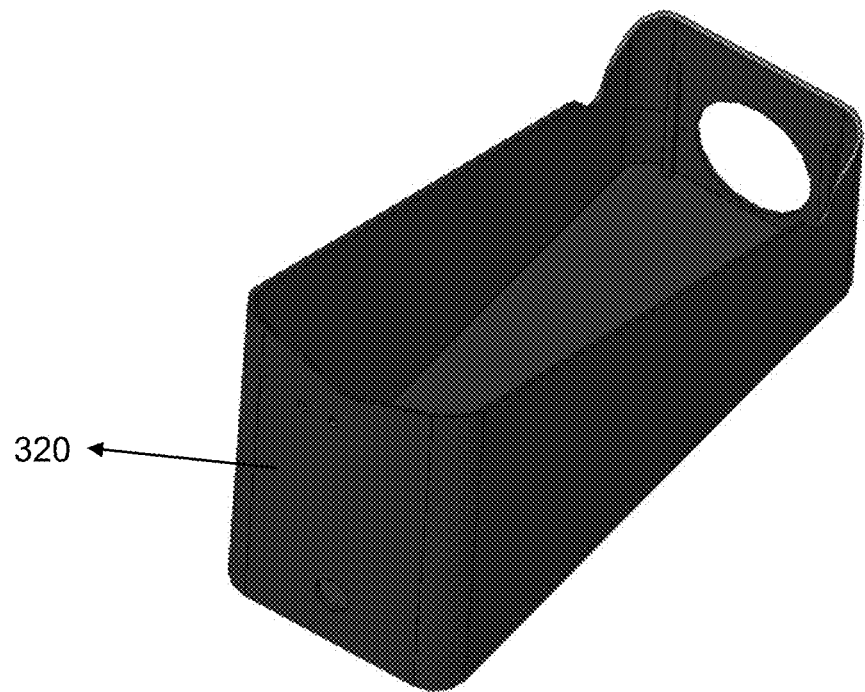
Figure 6:
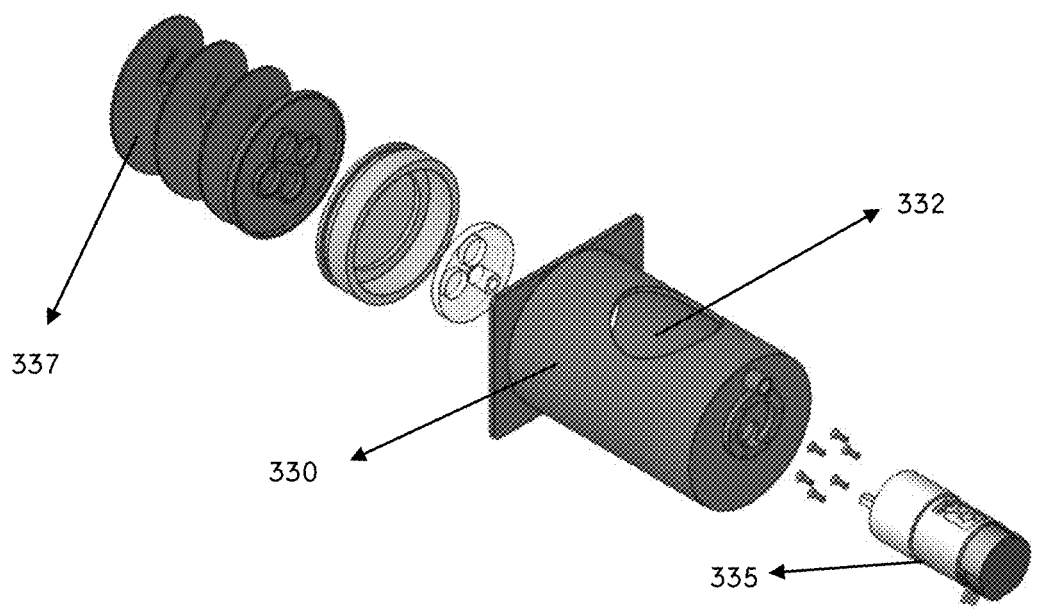
FIG. 6 is a diagram depicting the various internal parts of the horizontal feeder including the augur, the motor and the provisioning tunnel.

An embodiment of a horizontal feeder is shown in FIG. 3A. An exploded view of the feeder is shown in FIG. 3B. Feeder Portion 310 has a substantial triangular shape. Feeder Portion 310 spreads horizontally. In some exemplary embodiments, the angle may be useful for sliding dry ingredients, such as vegetables, fruits, seeds, or the like. Additionally, or alternatively, wet ingredients may slide down. In some cases, Motor 340 may be utilized to cause rotation of Feeder Portion 310 and assist the ingredients in sliding down the diagonal base. Additionally, or alternatively, Feeder Portion 310 may be tilted by being pushed up and down by Motor 340, while being hinged, such as at Protrusion 314 which matches a corresponding recess in Base Portion 320.

It is noted that Base Portion 320, on which Feeder Portion 310 is positioned, comprises a volume that is not used for any ingredients. In some exemplary embodiments, Base Portion 320 houses Motor 340 in a clean environment that is not exposed to the ingredients.

In some exemplary embodiments, Base Portion 320 houses Provisioning Tunnel 330 and auger conveyor deployed therein. In some exemplary embodiments, a Motor 335 of the auger conveyor may be housed within Base Portion 320, in a clean environment that is not exposed to the ingredients.

In some exemplary embodiments, Provisioning Tunnel 330 may have an Opening 332 that matches Opening 312 of Feeder Portion 310. Ingredients stored in Feeder Portion 310 may pass through Openings 312 and 332 to reach Provisioning Tunnel 330. An auger conveyor may be utilized to move the ingredients horizontally through Provisioning Tunnel 330 and towards Dispensing Opening 322.

A replaceable auger cartridge may be placed within Provisioning Tunnel 330. The replaceable cartridge may comprise an auger conveyor, such as including a helical screw. The replaceable cartridge may be replaced. Each cartridge may have different properties, such as diameter, pitch, material, or the like.

Figure 7:
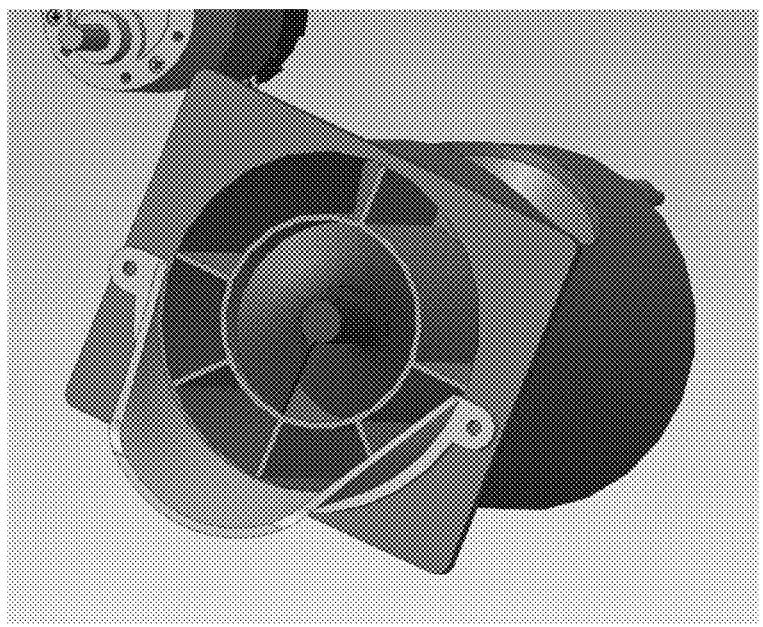
FIG. 7 illustrates an embodiment of the present invention wherein the diameter of the augur is smaller than the provisioning tunnel and the cartridge of the provisioning tunnel is blocked to limit the travel of ingredients from the feeder.
Figure 8:
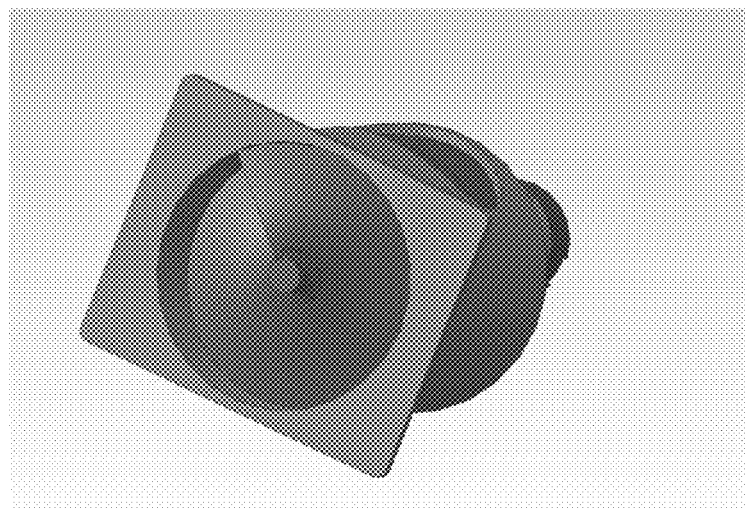
FIG. 8 is a diagram representing similar diameter of the Provisioning Tunnel and the auger wherein the cartridge does not comprise any blocking portion.

In some exemplary embodiments, the auger conveyor may have a smaller diameter than that of Provisioning Tunnel 330. The cartridge may block the remainder area, so as to limit the ingredient to travel within the limited diameter. An example is depicted in FIG. 7, where a portion of the Provisioning Tunnel 330 is blocked, and the diameter of the auger is smaller than that of Provisioning Tunnel 330. As is shown in FIG. 8, the auger may have the diameter of the Provisioning Tunnel 330 and the cartridge may not comprise any blocking portion.

In some exemplary embodiments, the cartridge may have a different auger pitch. The pitch of the auger may define how many rotations are required in order for the auger to push a particle towards Dispensing Opening 322. In addition, in some cases, the pitch may define a maximal size of the ingredient itself. For example, a larger pitch may be required for whole tomatoes than for olives, due to their different sizes.

In some exemplary embodiments, the cartridge may be characterized by the material of the auger itself. For example, an auger made of rubber may be utilized for lettuce, while an auger made of plastic may be utilized for tomatoes.

Figure 9:
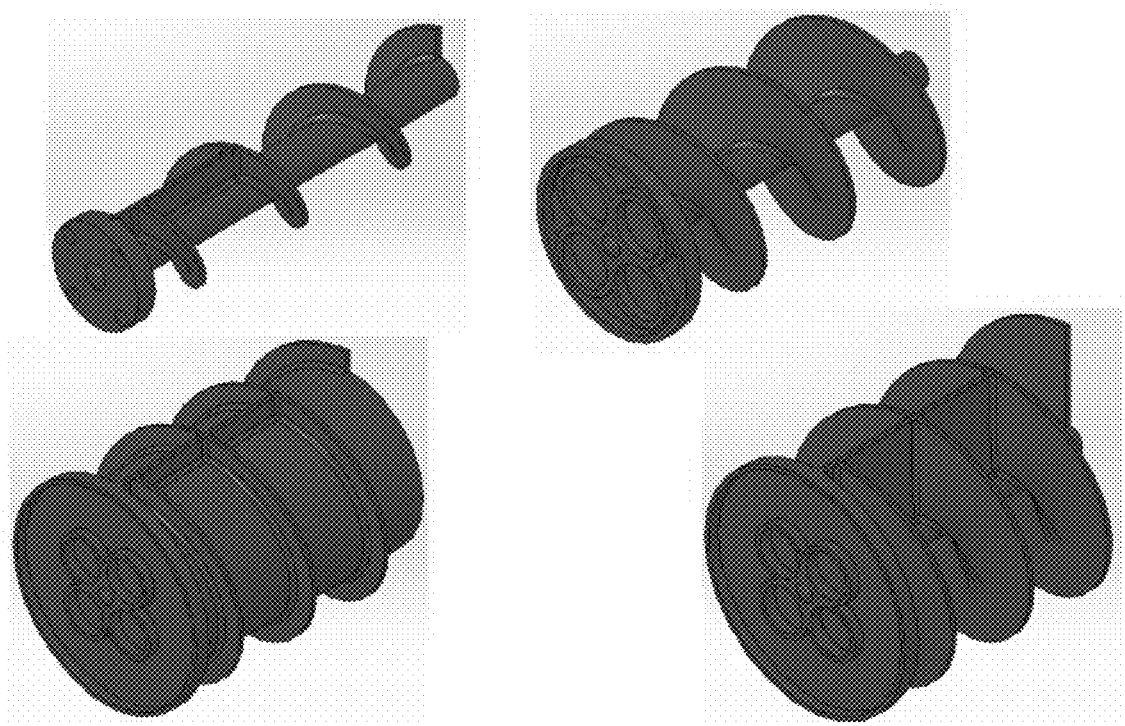
FIG. 9 is a diagram representing a variety of replaceable auger cartridges of the present invention.

Variety of replaceable auger cartridge is illustrated in FIG. 9.

In some exemplary embodiments, a cook may want to load a feeder. The cook may place the ingredients within Feeder Portion 310. In some cases, the cook may desire to add a new ingredient in addition to or instead of an existing ingredient. The cook may select an appropriate replaceable auger cartridge, based on a desired function. The replaceable auger cartridge may be selected based on a diameter, pitch, material and other properties that are suitable for pushing the ingredient type.

In some exemplary embodiments, the same Motor 335 may be utilized for all cartridges. A snap-in connection or another form of mechanical connection may be utilized to connect Motor 335 with Auger 337, so as that Motor 335 can rotate Auger 337. Additionally, or alternatively, the cartridge may comprise different Motor 335.

In some exemplary embodiments, a controller may be operatively coupled to any one of Motors 335, 340. The controller may be configured to invoke the respective motor into action. In some cases, the automated cooking apparatus may comprise a processor that may instruct the controller to invoke a desired motor, based on a determination of a desired ingredient for provisioning. In some cases, an amount of rotation of the auger may be determined by the processor, such as based on a desired amount of ingredient, the pitch, a state of matter of the ingredient, the type of ingredient, or the like.

The present disclosed subject matter may be a system, a method, and/or a computer program product. The computer program product may include a computer readable storage medium (or media) having computer readable program instructions thereon for causing a processor to carry out aspects of the present disclosed subject matter. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present disclosed subject matter may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk. C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosed subject matter. Aspects of the present disclosed subject matter are described herein with reference to flowchart illustrations and/or block diagrams of methods, apparatus (systems), and computer program products according to embodiments of the disclosed subject matter. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosed subject matter. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated by persons skilled in the art that the present disclosed subject matter is not limited by what has been particularly shown and described hereinabove. Rather the scope of the disclosed subject matter also includes variations and modifications that would occur to persons skilled in the art upon reading the foregoing description and which are not in the prior art.

The terminology used herein is for the purpose of describing particular embodiments only and is not intended to be limiting of the disclosed subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosed subject matter has been presented for purposes of illustration and description, but is not intended to be exhaustive or limited to the disclosed subject matter in the form disclosed. Many modifications and variations will be apparent to those of ordinary skill in the art without departing from the scope and spirit of the disclosed subject matter. The embodiment was chosen and described in order to best explain the principles of the disclosed subject matter and the practical application, and to enable others of ordinary skill in the art to understand the disclosed subject matter for various embodiments with various modifications as are suited to the particular use contemplated

We claim:

1. An ingredient feeder for an automated cooking apparatus, the ingredient feeder comprising:
   a plurality of containers in a horizontal orientation, wherein the containers are placed in a side-by-side position and stacked one above the other and wherein each horizontal container comprises:
   an upper feeder portion;
   a lower base portion;
   a first motor;
   a second motor;
   an auger with an auger conveyer;
   a provisioning tunnel;
   a controller; and
   a processor,
   wherein,
   the ingredient feeder is re-used for different ingredients having varied shapes and sizes;
   wherein,
   the upper feeder portion has a horizontal planar shape and the lower base portion has an unequal funnel shape with an opening for sliding ingredients to the lower base portion;
   wherein,
   the ingredients are refilled offline in each of the plurality of ingredient containers, away from the ingredient feeder, enabling a quick replacement;
   wherein, the upper feeder portion has a base, at which is hinged with the lower base portion by a protrusion matching with a corresponding recess of the lower base portion;
   wherein,
   the first motor, the second motor, the provisioning tunnel, and the auger with the auger conveyer are housed within the lower base portion;
   wherein,
   the auger with the auger conveyer are configured to move the ingredients; from the lower base portion to a dispensing opening of the ingredient feeder; and
   wherein,
   the controller is configured to control dispensing of the ingredients from the upper feeder portion to the lower base portion and from the lower base portion to the dispensing opening.

2. The ingredient feeder of claim 1, wherein the provisioning tunnel, has an opening coinciding with an opening of the upper feeder portion, the opening of the opening of the provisioning tunnel configured for passing the ingredients stored in the upper feeder portion through the openings of the base of the upper feeder portion through the provisioning tunnel, to reach the dispensing opening.

3. The ingredient feeder of claim 1, wherein the feeder incorporates a series of sensors configured to estimate levels of ingredients in the feeder and to provide a replenishment warning when the levels fall below a critical level.

4. The ingredient feeder of claim 1, wherein the feeder is controlled by a controller which is operatively coupled to a couple of motors and configured to invoke the respective motor into action.

5. The ingredient feeder of claim 1, wherein a processor is configured to command the controller to activate a desired motor based upon a determination of a desired ingredient for provisioning.

6. The ingredient feeder of claim 1, wherein the first motor is configured to assist tilting of the upper feeder portion for sliding the ingredients from the upper feeder portion to the lower base portion.

7. The ingredient of claim 1, wherein a rotator motion of the first motor serves to assist the ingredients in the upper feeder portion to slide down the provisioning tunnel.

8. The ingredient feeder of claim 1, wherein the auger conveyer is configured to convey the ingredients through the provisioning tunnel towards the dispensing opening.

9. The ingredient feeder of claim 1, wherein the auger with an auger conveyer is a replaceable auger cartridge positioned within the provisioning tunnel and includes a helical screw.

10. The ingredient feeder of claim 1, wherein the auger conveyor has a diameter and an associated auger conveyor cross-sectional area smaller than that of a diameter of the provisioning tunnel and an associated provisioning tunnel cross-sectional area, wherein the cartridge is configured to limit the ingredients to be conveyed by the auger conveyor to the provisioning tunnel.

11. The ingredient feeder of claim 1, wherein the auger has a diameter equivalent in size to the diameter of the provisioning tunnel and wherein the cartridge does not comprise any blocking portion.

12. The ingredient feeder of claim 1, wherein the cartridge and the auger are made of similar materials.

13. The ingredient feeder of claim 1, wherein the auger is made of rubber.

14. An ingredient feeder for an automated cooking apparatus of claim 1, wherein the said auger is made of rubber.

15. The ingredient feeder of claim 1, wherein the auger is made of plastic.

16. The ingredient feeder of claim 1, wherein the second motor is connected to the auger with a snap-in connection for rotation of the auger.

17. The ingredient feeder of claim 1, wherein a rotation of the auger is determined by the processor based on a desired amount of ingredients, the pitch, a state of matter of the ingredients, and a type of ingredient.

* * * * *